United States Patent
Kitano et al.

[11] 3,856,494
[45] Dec. 24, 1974

[54] LIGHT-CONDUCTING GLASS STRUCTURES MADE BY VAPORIZATION

[75] Inventors: Ichiro Kitano, Kobe; Yoshiro Ikeda, Nishinomiya, both of Japan

[73] Assignee: Nippon Selfoc Kabushiki Kaisha, (also known as Nippon Selfoc Co. Ltd., Tokyo-to, Japan

[22] Filed: June 5, 1972

[21] Appl. No.: 259,780

Related U.S. Application Data

[63] Continuation-in-part of Ser. No. 865,201, Oct. 9, 1969, abandoned.

[30] Foreign Application Priority Data
Oct. 19, 1968 Japan.............................. 43-76229
Dec. 12, 1968 Japan.............................. 43-91375

[52] U.S. Cl........................... 65/2, 65/32, 106/47 R, 106/50, 350/96 W, 65/30
[51] Int. Cl.............................. C03c 15/00, C03b
[58] Field of Search............... 65/32, 30; 350/96 W; 106/47 R

[56] References Cited
UNITED STATES PATENTS
2,612,726  10/1952  Nordberg............................... 65/32
3,228,761  1/1966  Jack et al............................... 65/32
3,298,811  1/1967  Kurkjian et al....................... 65/32 X
3,647,406  3/1972  Fisher..................................... 65/30
3,659,915  5/1972  Maurer et al......................... 65/30
3,756,798  9/1973  Ernsberger........................... 65/32 X

*Primary Examiner*—S. Leon Bashore
*Assistant Examiner*—Frank W. Miga
*Attorney, Agent, or Firm*—Robert E. Burns; Emmanuel J. Lobato; Bruce L. Adams

[57] ABSTRACT

A glass body containing a dissolved vaporizable component is heated under conditions whereby some of this component can vaporize off from the surface of the glass body to cause the concentration of the residual component dissolved in the glass body to vary with a continuous gradient toward the surface from the axis along which light is to advance through the glass body, whereby a light-conducting glass structure is produced wherein the refractive index thereof varies with a continuous gradient in directions transverse to the above mentioned axis.

7 Claims, 4 Drawing Figures

LIGHT-CONDUCTING GLASS STRUCTURES MADE BY VAPORIZATION

CROSS REFERENCE TO RELATED APPLICATIONS

This application is a continuation-in-part of our co-pending application Ser. No. 865,201 filed on Oct. 9, 1969 now abandoned, entitled "PRODUCTION OF LIGHT-CONDUCTING GLASS STRUCTURE."

BACKGROUND OF THE INVENTION

This invention relates generally to light-conducting substances and structures and more particularly to the production of light-conducting glass structures in each of which the refractive index varies progressively in directions transverse to the direction in which light is to advance through the structure.

Optical fibers known heretofore for the purpose of conducting light have in each case comprised a core glass body having a high refractive index and a covering layer therearound of a glass of low refractive index. When an incident light is introduced into one end of the core body, the light is conducted through the fiber core body as it undergoes repeatedly total reflection at the interface between the core body and the covering layer.

In this case, however, as the light thus advances through the fiber interior by repetitive total reflection, phase-velocity lag occurs and gives rise to disadvantageous distortion in light signals and picture images which are thus being conducted. Such a phase-velocity lag gives rise to great difficulty in conducting light signals which vary at high speed in the case where the light-conducting fiber is to be utilized for light communication.

Furthermore, a light beam introduced as incident light into the fiber progressively spreads in width as it advances by being reflected by curved surfaces, and has the further disadvantage of being accompanied by reflection loss at the interface, which is also one cause of impairment of efficiency in light communication.

We have found that a light-conducting optical fiber can be caused to have a refractive index distribution or gradient wherein, in any cross section perpendicular to the centerline of the fiber, the refractive index decreases progressively from the centerline outward toward the outer peripheral surface, more specifically, a distribution conforming substantially to following equation.

$$n = n_o (1 - ar^2), \quad (1)$$

where:
$n_o$ is the glass refractive index at the central part of the fiber;
$r$ is distance from the centerline;
$n$ is the refractive index at a point at distance $r$; and
$a$ is a constant, which is usually from $2 \times 10^{-4} \text{mm}^{-2}$ to $2 \times 10^2 \text{mm}^{-2}$, especially from $1 \times 10^{-3} \text{mm}^{-2}$ to $1 \times 10^2 \text{mm}^{-2}$ when the distance $r$ is expressed in terms of mm. (millimeter).

In a glass fiber having such a refractive index distribution, an incident light beam entering one end thereof advances therethrough along an undulating path. Accordingly, there is no phase-velocity lag in the light beam exiting from the fiber, and, moreover, spreading of the light beam width is prevented.

SUMMARY OF THE INVENTION

It is an object of the present invention to utilize certain findings we have made, as described hereinafter, to produce glass structures which have refractive index gradients of the above described character and are highly suitable for effective utilization in conducting high-speed light-pulse signals and optical images.

According to the present invention, briefly summarized, there is provided a method of producing light-conducting glass structures of the character referred to above, characterized by the steps of preparing a glass body containing a vaporizable component dissolved therein and heating this glass body under conditions such that the vaporizable component can vaporize from the outer surface thereof thereby to cause evaporation of this component, and thereby to cause the concentration of this component to vary continuously from the axis along which light is to advance through the glass body toward the outer surface of the glass body. The glass body has a refractive index which varies continuously from the light-advance axis toward the outer surface so that the refractive index varies progressively in directions transverse to the light-advance axis.

The nature, principle, and utility of the invention will be more clearly apparent from the following detailed description beginning with general considerations and concluding with specific examples of practive constituting preferred embodiments of the invention.

DETAILED DESCRIPTION

Figure 1:
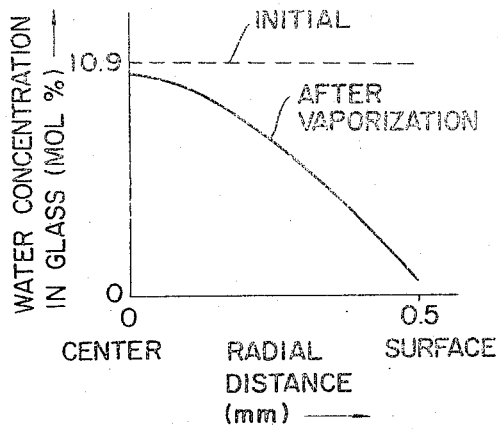
FIGS. 1 and 2 are graphical illustrations of the radial concentration distribution of water and the radial refractive index distribution, respectively, in a cross-section perpendicular to the axis of a glass fiber produced in accordance with the invention.

A vaporizable component suitable for use to cause a variation in the glass refractive index in accordance with the invention is a substance which is soluble in the glass (for example, to an extent whereby the content thereof in the glass is of the order of from 0.5 to 10 percent by weight) and is vaporizable from the outer surface of the glass at least at the aforementioned heating temperature (preferably lower than the temperature at which substantial thermal deformation of the glass to be processed occurs).

One specific example of such a substance is water. Another specific example is a gas which dissolves once in the glass at the time of melting of the glass and is in gaseous form at the above mentioned temperature. At room temperature and atmospheric pressure, this "gas" is not necessarily a gas or vapor and may be in the form, for example, of a liquid. More specific examples of suitable substances are oxygen nitrogen, rare gases such as argon, oxides of carbon such as carbon dioxide, oxides of sulphur such as sulphur trioxide, ammonia and a mixture of nitrogen and hydrogen. It is known that these gases can be dissolved uniformly in glass in considerable quantities in accordance with their respective characteristics.

The use of water, as a specific example of a vaporizable component in accordance with the invention as mentioned above, will now be considered in more detail.

It has been known for a long time that residual water content in a glass and the state of chemical bond thereof has an effect on the characteristics of that glass. Directing our attention particularly to the relationship between residual water content and the refractive index in glass, we have found that it is possible to produce a light-conducting glass structure of the character described above and contemplated by the invention by causing water to be contained beforehand in a large quantity in a glass body and then causing a variation in the distribution of this water content thereby to establish a refractive index gradient in the glass body.

While silicate, borate, and phosphate glasses can be used for the glass body, phosphate glasses are particularly effective because of their capacity for containing a relatively large quantity of residual water. The variation $\Delta n$ in refractive index in a phosphate glass of the designation $MO/P_2O_5$ (wherein M represents Mg, Ba, Cd, or Zn) in the case where the water content differs widely for substantially the same ratio $MO/P_2O_5$ is from 0.001 to 0.01, whereby there is a possibility of applying this as a refractive index difference to be imparted to optical fibers for light communication.

The decrease in refractive index due to a decrease in the water content within a glass will now be considered with respect to the relationship thereof with the structure of the glass.

In an oxide glass, water may be considered to exist as an OH group connected in the form of a network structure, and each connection may be considered to be such that hydrogen is held in the structure by a hydrogen bond of the OH . . . O. In a phosphate glass of a composition such that $(MO) / (P_2O_5)$, hereinafter referred to as $R_M$, or $(MO+H_2O) / (P_2O_5)$, hereinafter referred to as $R_{MH}$, is less than unity (one), hydrogen bonds $OH_{(m)}$ . . . O exist at various places as branch points of a branched structure such as the following.

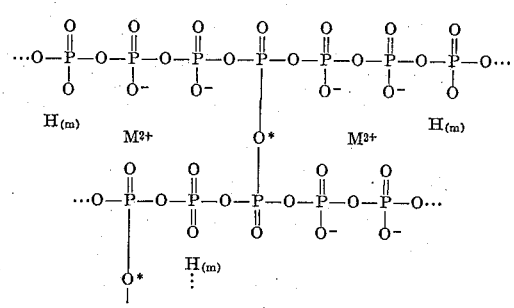

When the value of $R_M$ or $R_{MH}$ becomes close to or slightly greater than unity (one), the branched structure progressively changes to a chain or linear structure, and the units of the OH group assume a state wherein they form the ends of chain units of a certain size, such as the following, the hydrogen bonds becoming weak.

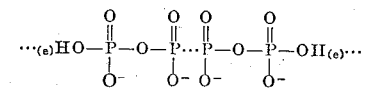

In such structures removal of water content gives rise to a new formation of P — O* — P of bridging characteristic due to the removal of $OH_{(m)}$ group in the former case and to a change of the character of the end $O^{2-}$ from single bonding to dual bonding (P — O — P) due to the removal of $OH_{(e)}$ group in the latter case.

Stevels has compared the ion refractions of bridging oxygen connected at both ends to network-forming ions within a glass structure and of non-bridging oxygen connected at one end to network-forming ions and at the other end to network-modifying ions and has verified that, in general, the ion refraction of non-bridging oxygen is greater. For example, in a silicate glass, the values thereof are $O^{2-}$ (bridging) = 3.66 and $O^{2-}$ (non-bridging) = 4.78.

According to the Lorenz-Lorenz equation, the refractive index of a medium in the light wavelength region can be represented as follows.

$$(n^2 - 1/n^2 + 2) = (4\pi/3) \Sigma N_i \alpha_i, \qquad (2)$$

where:
$n$ is the refractive index;
$N_i$ is a number of atoms $i$ per unit volume; and
$\alpha_i$ is the electron polarizability thereof. The refractive index $n$ is caused to decrease by a decrease in oxygen ions of large $\alpha$ due to the removal of water content and by a decrease in non-bridging oxygen of large $\alpha$ and an increase in bridging oxygen of smaller $\alpha$ as mentioned above. The change in the refractive index produced by a decrease in the number of hydrogen ions is negligibility small because of the low electron polarizability of the hydrogen ion.

On one hand, when compactness of the structure is considered, it is apparent that removal of $OH_{(m)}$ groups causes the structural compactness to become poor since the two hydrogen bonds' mutual bonding chains change into one single branch point P — O* — P bond, and the number of connective points between chains is halved, while removal of $OH_{(e)}$ groups causes compactness to become poor since short chain units are thereby connected and become long, whereby the structure becomes structurally loose.

In the case where the refractive index is close to unity (one), the Gladstone-Dale equation as follows is obtained.

$$n - 1 = R/V, \qquad (3)$$

where:

R is molecular refraction; and

V is molecular volume. This relationship also indicates that a poor structural compactness means an increase in V and causes a decrease in the refractive index $n$.

As is apparent from the above consideration, a decrease in the water content in a glass causes a decrease in the refractive index. The water content in a glass is influenced by factors such as the raw materials used, the glass composition, melting temperature and time, and the furnace interior atmosphere. By selecting glass compositions containing large quantities of residual water, melting these glasses, and further heating these glasses in atmospheres such as a vacuum thereby to cause diffusion and removal of water from the glass outer surface, we have caused a variation in the distribution of water content concentration within each glass and have succeeded in producing glass structures each having a refractive index gradient conforming substantially to Equation (1) from the central part of the glass structure toward the outer surface thereof.

The migration within the glass of water from the interior toward the surface is determined (or controlled) by the rate of diffusion, and the water content is distributed in such a way that the concentration decreases continuously from the glass central part toward the outer surface in accordance with the diffusion equation. As a result, a refractive index gradient of parabolic form is established within the glass.

While the higher the heating temperature is, the shorter will the time be for attaining the objective results, an excessively high temperature will cause deformation of the glass and, therefore, is not desirable. Furthermore, in order to facilitate the diffusion and removal of water within the glass, the heating process can be carried out in a vacuum or in an atmosphere of low partial pressures of $H_2O$.

In another embodiment of the present invention, use is made of any of the aforementioned gases for the vaporizable component as described more fully below.

In the case where a gas for vaporizing and being discharged from within a glass exists in dissolved state within the glass, two states thereof, in general, can be considered. One is that wherein the molecules constituting the gas (hereinafter referred to as "gas molecules") are dissolved in and occupy positions in the interstices or voids of the network structure of the glass, being bonded in a so-called physical state. Of the aforementioned gases, $N_2$, He, Ne, Ar, and others are considered to be dissolved in such a form and state. Since these gas molecules are thus dissolved in a state wherein they occupy parts which are ordinarily empty spaces, the glass compactness increases, and, theoretically, the molecular volume decreases, while the refractive index thereof increases.

The other state in which gas molecules dissolve in glass is that wherein the gas molecules are chemically connected to the network structure with non-bridging oxygen ions within the glass as a connective medium. Examples of such gas molecules are $CO_2$, $O_2$, $NH_3$, and $SO_3$. An increase in the concentration of $CO_2$, $O_2$ or $NH_3$ present in dissolved state in the glass results in an increase in the glass refractive index, while an increase in the concentration of $SO_3$ dissolved in the glass results in a decrease in the glass refractive index.

In accordance with this embodiment of the present invention, a glass body in which a relatively large quantity of a gas is dissolved beforehand is prepared, and in the case where the gas molecules are to be chemically bonded, this can be accomplished with relative ease by appropriately selecting the chemical composition of the glass.

However, a gas which is present in dissolved state in the glass with a physical connection, as in the case of $N_2$, is of a very small quantity in the glass in which it is dissolved by an ordinary procedure. Such a gas should thus be forced to dissolve in the glass. In order to dissolve a very large quantity of gas molecules or atoms in the glass, it is possible to pass bubbles of the specified gas continuously through the glass in molten state or to carry out a process of charging the specified gas under high pressure into a high-temperature, high-pressure vessel containing the glass in molten state, causing the gas dissolved in the molten glass and the gas at high pressure to reach a state of equilibrium, and cooling the glass to produce a glass in which the gas is dissolved in a large quantity.

Furthermore, it is possible, by preparing a glass through the use of glass raw materials such as to form the specified gas by decomposition, to form this dissolved gas in the glass. For example, by using a sulphate such as sodium sulphate or lead sulphate as a raw material for the glass, $SO_3$ can be caused to exist in dissolved state in the glass. In the case where phosphate glass is to be produced, water can be deposited within the glass by preparing the glass using phosphoric acid as one of the raw materials.

Then, with the use of a glass in which the gas molecules or atoms are dissolved in a large quantity by a method as described above, a rod material or fiber material is formed. Furthermore, in order to vary the distribution of the concentration of the gas dissolved uniformly in the glass, the glass is heated. As this heating process progresses, the gas adsorbed on the outer surface of the glass structure is first driven off, and, as the heating temperature is raised, the gas molecules or atoms dissolved within the glass diffuse outward from the interior and migrate progressively to the glass outer surface to be discharged out therefrom.

It is preferable to heat the glass in a vacuum or an atmosphere wherein the partial pressure of the gas molecules to be dissolved is low since the diffusion can thereby be accelerated.

The gas molecules migrate in the glass interior in accordance with the rate of diffusion of the gas, and the distribution of the concentration of the gas molecules or atoms from the glass outer surface toward the interior is of a parabolic form. As a result, a refractive index gradient is imparted to the glass.

The fiber glass body initially contain a uniform distribution of the gas or the component, such as $H_2O$, $H_2$, He, Ne, Ar, $CO_2$, $O_2$, of $NH_3$, throughout the glass, and it thus has a uniform refractive index throughout the glass. Upon being heated under vacuum or the atmosphere having a low partial pressure of the component to be evaporated, the component which has been dissolved in the region near the surface of the fiber glass body will vaporize off the glass body through the surface. Such vaporization results in reduction in concentration of the component near the surface, which reduction in concentration will in turn cause the component within the deeper regions of the glass body to diffuse and migrate outwardly toward the surface thereby to compensate the concentration differential.

When the heating is continued for a certain duration of time, the concentration of the component nearer the surface is lowered or reduced from the original one before the heating more intensely than the concentration of the component of the deeper parts of the glass body. Since a glass containing more component has a greater refractive index than a glass containing less component, the refractive index of the glass nearer the surface is reduced from the original one before the heating more intensely than the refractive index of the deeper regions of the glass body. Thus, there will be produced a concentration distribution of the component in the surface perpendicular to the center axis of the glass fiber such that the concentration continuously decreases from the center axis toward the surface of the fiber and there will thus be produced a refractive index gradient such that the refractive index continuously decreases from the center axis toward the surface.

In the case where the duration of time of such heat treatment under vacuum is relatively short, concentration gradient of the component and thus refractive index gradient will be produced only at the surface of the fiber, and the concentrations of the component and refractive index will remain substantially unchanged in a deeper part of the glass fiber. In the case where the duration of time is relatively long, concentration of the component is reduced from the original ones even at the central axis, and refractive index at the center axis is reduced from the original one. In the case where the duration of time is excessively long, almost all of the component within the fiber will vaporize off the fiber, and the concentration gradient of the component within the glass fiber is not produced amply enough to establish a required refractive index gradient.

Thus, when the duration of time is so selected as to produce within the glass fiber such concentration of the component that the concentration is substantially the same as the original one at the center axis and is slightly lowered at a place slightly distant from the axis or that it is slightly lowered at the center axis, the concentration of the component will decrease continuously from the center axis toward the outer surface of the fiber in proportion to the square of the radial distance from the center axis of the fiber. Since refractive index of a glass varies substantially in proportion to variation in the concentration of the gas within the glass, the fiber will have a preferable refractive index distribution such that it continuously decreases from the center axis toward the outer or periphery surface thereof substantially in proportion to the square of the radial distance from the axis. In such a preferable refractive index gradient, thhe concentration of the component at the outer surface can be substantially zero if desired.

When a glass rod in which $SO_3$ has been dissolved is subjected to heat treatment to cause the $SO_3$ to vaporize off the rod, the same will hold true except that the refractive index gradient is reversed owing to the fact that the component $SO_3$ reduces a refractive index of glass when it is dissolved in the glass.

Any of the silicate, borate, and phosphate glass mentioned hereinbefore can be utilized as a glass for this embodiment of the present invention provided that a large quantity of gas molecules or atoms can exist in dissolved state therein. The most typical examples of oxides constituting glasses include; $SiO_2$, $P_2O_5$, $ZnO$, $MgO$, $CaO$, $PbO$, $B_2O_3$, $Na_2O$, and $K_2O$, and the like. While the glass body in accordance with the invention may be of any shape, the most common structural forms are in elongated shapes such as rods or bars and fibers or filaments (of any desired cross sections).

In order to indicate still more fully the nature and utility of the invention, the following specific examples of practice constituting preferred embodiments of the invention and results are set forth, it being understood that these examples are represented ad illustrative only and are not intended to limit the scope of the invention.

EXAMPLE 1

With the aim of preparing a glass composed of 48 mol percent of $P_2O_5$ and 52 mol percent of ZnO, a blended mixture was prepared by using approximately 85 percent of orthophosphonic acid ($H_3PO_4$) as a source material for $P_2O_5$ and an "Extra-Pure" reagent of zinc oxide as a source of ZnO.

This mixture was melted with agitation in a platinum crucible disposed in an electric furnace heated to 1,200°C. The chemical composition of the homogeneous glass thus obtained was 42.9 mol percent of $P_2O_5$, 45.7 mol percent of ZnO, and 11.4 mol percent of $H_2O$. The refractive index of this glass was 1.5271.

From this homogeneous glass, a plate body of a thickness of approximately 1 mm., width of approximately 2 mm., and length of approximately 5 mm. was cut and treated for 28 hours in a stream of $N_2$ gas (flowrate of 3 liters/min.) at 350°C. The refractive index $n$ of this glass body at its outer surface was measured and found to be 1.5250 and $n_o$ at the center to be approximately 1.5271, substantially the same as the original one. Then, when the glass surface was successively shaved off, and the refractive index was measured at each surface thus exposed, it was verified that the distribution of the refractive index from the original outer surface inward toward the center was substantially in conformance with the aforementioned equation $n = n_o (1 - ar^2)$, in which the valve of a in this instance was 0.55 $cm^{-2}$.

EXAMPLE 2

With the aim of producing a glass composed of 55 mol percent of $P_2O_5$ and 45 mol percent of BaO, a blended mixture was prepared by using approximately 85 percent of orthophosphoric acid ($H_3PO_4$) as a source material for $P_2O_5$ and an "Extra-Pure" reagent of barium oxide as source of BaO.

This mixture was melted while being agitated in a platinum crusible disposed in a electric furnace at from 1,050 to 1,150°C. The chemical composition of the glass thus obtained was 49.7 mol percent of $P_2O_5$, 39.4 39.4 mol percent of BaO, and 10.9 mol percent of $H_2O$, and the refractive index thereof was 1.5710.

From this homogeneous glass, a round rod of a diameter of approximately 1 mm. and a length of approximately 50 mm. was fabricated and treated for 10 hours in a furnace at 350°C and under a vacuum of approximately $10^{-4}$ mm. Hg. As a result, a glass body in which the refractive index at the outer surface thereof was 1.5650 and $n_o$ at the center was approximately 1.5710, substantially the same as the original one; and the refractive index increased from the surface toward the center with a distribution conforming substantially to the aforementioned equation $n = n_o (1 - ar^2)$ was produced, the value of a being 1.53 $cm.^{-2}$ in this case.

Figure 2:
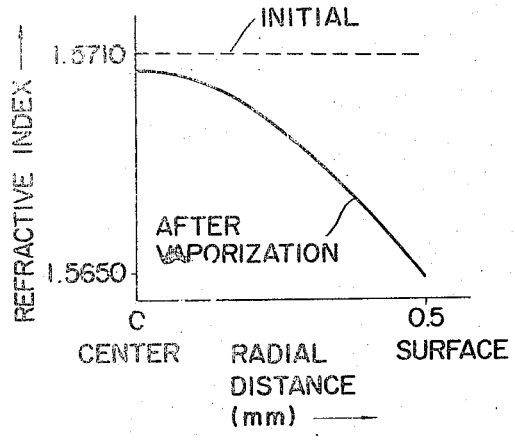

FIGS. 1 and 2 show the radial distribution of water concentration and refractive index gradient, respectively, in the glass fiber thus produced.

The two ends of this glass rod were further cut off, and the exposed end surfaces of the rod were finished to planes perpendicular to the rod centerline, whereupon the rod was found to be highly effective for light conduction.

EXAMPLE 3

A glass composed of 73.7 percent by weight of $SiO_2$, 5.1 percent by weight of CaO, and 21.2 percent by weight of $Na_2O$ was maintained for approximately 3 hours at 1,000°C in a nitrogen atmosphere under a pressure of 4,000 atmospheres and thereafter cooled to room temperature while still under the high pressure. During this treatment, $N_2$ had dissolved into the glass, whereby the composition in percentage by weight of the resulting glass was 73.20 percent of $SiO_2$, 5.10 percent of CaO, 21.04 percent of $Na_2O$, and 0.67 percent of $N_2$.

A rod of approximately 1-mm. diameter and approximately 50-mm. length was formed from this glass, heated for 10 hours at 450°C under atmospheric pressure, and then cooled to room temperature.

It was found that by this heat treatment, the nitrogen which had once dissolved in the glass during the initial high-pressure treatment was vaporized and driven off from the glass surface by second heating at atmospheric pressure, whereby a gradient in the concentration of the residual nitrogen was established within the glass. As a result, it was found that the refractive index at the centerline of this glass rod was 1.518, and the refractive index progressively decreased from the center toward the outer surface of the rod to a value of 1.510 at the surface.

The two ends of this glass rod were cut off and the resulting end surfaces were finished to transverse planes perpendicular to the rod centerline, whereupon a rod highly effective for use in light conduction was produced.

EXAMPLE 4

A glass composed of 71.8 percent by weight of $SiO_2$ and 28.2 percent by weight of $K_2O$ was maintained for approximately 3 hours at a temperature of 800°C in an argon atmosphere under a pressure of 5,000 atmospheres and thereafter cooled to room temperature while still under the high pressure. During this treatment, argon had dissolved into the glass, whereby the composition in percentage by weight of the resulting glass was 71.0 percent of $SiO_2$, 27.8 percent of $K_2O$, and 1.2 percent of Ar.

A rod of approximately 1-mm. diameter and approximately 50-mm. length was formed from this glass, heated for 24 hours at 400°C under atmospheric pressure, and then cooled to room temperature.

It was found that the refractive index of the glass rod thus treated was 1.502 at the rod centerline and decreased with a substantially parabolic gradient from the centerline toward the outer surface, at which the refractive index was 1.491.

EXAMPLE 5

As raw materials for a glass, quartz, sodium carbonate, and Glauber's salt were blended to form a mixture, which was melted at a temperature of 1.350°C to prepare a glass composed of 73.6 percent by weight of $SiO_2$, 25.4 percent by weight of $Na_2O$, and 1.0 percent by weight of $SO_3$.

From this glass, a glass rod of approximately 2-mm. diameter and approximately 50-mm. length was formed. This glass rod was placed in a vacuum furnace and heated, as the furnace interior was progressively evacuated, to a temperature of 420°C, the glass rod then being maintained at this temperature and a furnace interior pressure of $10^{-5}$ mm. Hg. for 28 hours and then cooled to room temperature.

The glass rod thus processed was cut into two parts at its middle part in the longitudinal direction, and the distribution of the $SO_3$ concentration in the cross sections thus exposed was determined by means of a concentration measuring instrument. As a result, it was found that this distribution was such that the $SO_3$ concentration decreased progressively and continuously from the center toward the peripheral surface of the rod.

Furthermore, the refractive index of the glass rod was found to be 1.493 at the centerline thereof and 1.502 at the peripheral surface thereof.

Figure 3:
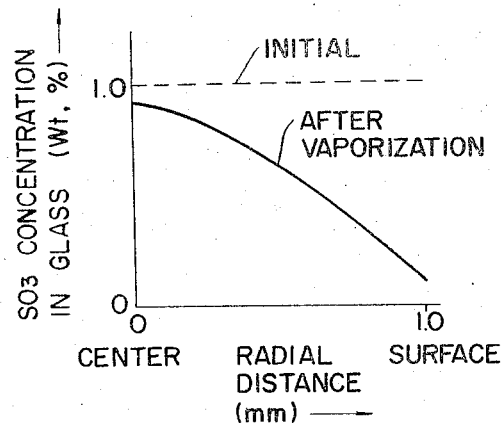
FIGS. 3 and 4 are graphical illustrations of the radial concentration distribution of $SO_3$ and the radial refractive index distribution, respectively, in a cross-section perpendicular to the axis of a glass fiber produced in accordance with the invention.
Figure 4:
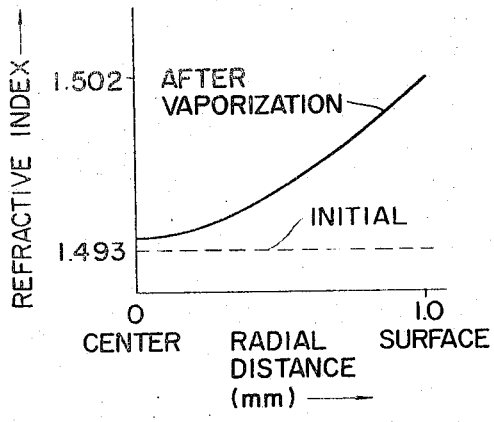

FIGS. 3 and 4 show the radial distribution of $SO_3$ concentration and refractive index gradient, respectively, in the glass fiber thus produced.

EXAMPLE 6

$PbSO_4$ as a source material for $SO_3$ and quartz and lead monoxide as other starting materials were blended in proportions for an objective glass composition to form a mixture, which was melted at a temperature of 900°C to produce a glass composed of 84.8 percent by weight of PbO, 9.1 percent by weight of $SiO_2$, and 6.1 percent by weight of $SO_3$.

A glass rod of approximately 1-mm. diameter and approximately 50-mm. length was formed from this glass and maintained for 20 hours in a vacuum furnace at a temperature of 390°C and under a vacuum of $10^{-4}$mm. Hg.

It was found that this glass rod has a refractive index which increased progressively with a continuous gradient from the centerline toward the outer surface of the rod. The value of the refractive index was 2.00 at the glass rod centerline and 2.03 at the outer surface.

What is claimed is:

1. A method of producing a light-conducting glass structure having a center axis in the principal direction of light conduction and having a refractive index gradient which decreases continuously from the center axis toward the outer surface of said structure in any cross-section thereof perpendicular to the axis, which comprises: preparing a fiber glass body consisting essentially of a substantially homogeneous mixture of glass and water said water being dissolved in said body in a uniform concentration throughout and said body thereby having a uniform refractive index throughout and heating said glass body for a period of time sufficient to cause vaporization of said water from the surface of said glass body and to reduce the concentration of said water near the surface substantially more than the concentration of said water in the deeper regions of said glass body, whereby the concentration of said water in said glass body decreases continuously toward said surface from the center axis of the body, thereby due to the varying concentration of water the refractive index gradient continuously decreases in the body from said axis toward the surface.

2. A method of producing a light-conducting glass structure as claimed in claim 1 in which said glass is phosphate glass containing water, and said glass is prepared using phosphoric acid as one of the raw materials, wherein said water is deposited within the glass body by decomposition of said phosphoric acid.

3. A method of producing a light-conducting glass structure as claimed in claim 1 in which said step of preparing the fiber glass body comprises maintaining a mass of molten glass in an atmosphere of said component under pressure thereby causing the component to dissolve into the mass of molten glass and thereafter forming the mass of glass thus treated into a fiber.

4. A method of producing a light-conducting glass structure as claimed in claim 1 in which said refractive index substantially satisfies the equation $n = n_o(1 - ar^2)$, wherein $r$ is a radial distance from said center axis, $n_o$ is the refractive index of the glass fiber at said center axis, $n$ is the refractive index of the glass fiber at said distance $r$, and $a$ is a positive constant.

5. A method of producing a light-conducting glass structure as claimed in claim 4 in which said positive constant $a$ is from $2 \times 10^{-4}$mm.$^{-2}$ to $2 \times 10^{2}$mm.$^{2}$ when said $r$ is expressed in terms of millimeter(mm.).

6. A method according to claim 1 in which said heating is carried out below atmospheric pressure.

7. A method according to claim 1 in which said heating is carried out in an atmosphere having a low partial pressure of water.

* * * * *